United States Patent
Li et al.

(10) Patent No.: US 10,380,670 B2
(45) Date of Patent: Aug. 13, 2019

(54) METHOD, MEDIUM, AND SYSTEM FOR FACILITATING USER IDENTIFICATION OF A PRODUCT

(71) Applicant: MASTERCARD ASIA/PACIFIC PTE LTD., Singapore (SG)

(72) Inventors: Jiaming Li, Singapore (SG); Jie Zhang, Singapore (SG); Sin Jian Tan, Singapore (SG); Bensam Joyson, Singapore (SG); Yong How Chin, Singapore (SG); Donghao Huang, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 482 days.

(21) Appl. No.: 15/230,877

(22) Filed: Aug. 8, 2016

(65) Prior Publication Data

US 2017/0061513 A1     Mar. 2, 2017

(30) Foreign Application Priority Data

Sep. 2, 2015  (SG) .............. 10201506976Q

(51) Int. Cl.
*G06Q 30/00* (2012.01)
*G06Q 30/06* (2012.01)

(52) U.S. Cl.
CPC .............. *G06Q 30/0623* (2013.01)

(58) Field of Classification Search
CPC .... G06Q 30/0623; G06Q 30/06; G06Q 20/18; G06Q 30/0601; G06Q 20/04
See application file for complete search history.

(56) References Cited

U.S. PATENT DOCUMENTS

| | | | | |
|---|---|---|---|---|
| 9,959,440 | B2* | 5/2018 | Chau | H04B 5/0062 |
| 2012/0075148 | A1* | 3/2012 | Cho | G06K 19/0723 |
| | | | | 343/702 |
| 2013/0048721 | A1* | 2/2013 | Rasband | G06Q 30/0241 |
| | | | | 235/383 |
| 2016/0316317 | A1* | 10/2016 | Mayiras | H04W 4/025 |

OTHER PUBLICATIONS

Iyer, Sridhar. "RFID: technology and applications." IIT Bombay, Presentation (Year: 2005).*

* cited by examiner

*Primary Examiner* — Matthew E Zimmerman
(74) *Attorney, Agent, or Firm* — Buchanan Ingersoll & Rooney PC

(57) ABSTRACT

System and method for facilitating user identification of a product. The system includes: a receiver unit configured to receive a signal; a memory module in communication with the receiver unit, the memory module having stored thereon product data that is stored in association with a transmittable product identity, wherein the receiver unit is further configured to (i) convert the received signal into its corresponding transmittable product identity and (ii) retrieve the product data from the memory module based on a comparison between the stored transmittable product identity and the converted transmittable product identity; and an output unit configured to output the retrieved product data to a user for facilitating user identification of the product.

12 Claims, 6 Drawing Sheets

METHOD, MEDIUM, AND SYSTEM FOR FACILITATING USER IDENTIFICATION OF A PRODUCT

TECHNICAL FIELD

The present disclosure relates broadly, but not exclusively, to systems and methods for facilitating user identification of a product.

BACKGROUND

Currently, when consumers see a product that interests them, they may have to make an effort to find out more about the product, such as the price of the product and which merchant sells the product. For example, if a consumer sees someone on the street wearing a nondescript jacket and wishes to identify and find out more about the jacket, they have to search the Internet using some descriptive keywords. However, this process may not be straightforward as there is a need for the user to think up the descriptive keywords, which can be difficult for some products, e.g. a nondescript black jacket.

If the consumer is able to identify the product and wishes to purchase the product, he/she needs to visit the merchant's shop or visit the merchant's online web-store. There is currently no single platform that combines both product identification (at any location) and purchasing of the identified products (at any time).

Currently, computer-implemented image recognition techniques may be used to identify products. However, these techniques are not 100% accurate due in part to errors occurring during the image recognition process.

Also, even if a product has a physical tag with a description of the product, consumers may be reluctant to read the description printed on the tag. For example, if a consumer sees someone on the street wearing a nondescript jacket and wishes to identify and find out more about the jacket, the consumer is unlikely to approach the owner of the jacket and ask for permission to read the tag.

A need therefore exists to provide systems and methods for facilitating user identification of a product that seek to address at least some of the above problems.

SUMMARY

According to a first aspect, there is provided a system for facilitating user identification of a product, comprising: a receiver unit configured to receive a signal; a memory module in communication with the receiver unit, the memory module having stored thereon product data that is stored in association with a transmittable product identity, wherein the receiver unit is further configured to (i) convert the received signal into its corresponding transmittable product identity and (ii) retrieve the product data from the memory module based on a comparison between the stored transmittable product identity and the converted transmittable product identity; and an output unit configured to output the retrieved product data to a user for facilitating user identification of the product.

In an embodiment, the system may further comprise a transmitter unit coupled to the product and configured to transmit the signal, wherein the receiver unit is configured to receive the signal from the transmitter unit when in communication with the transmitter unit.

In an alternative embodiment, the system may further comprise a transmitter unit coupled to the product and a relay unit configured to invoke the transmitter unit such that the transmitter unit is caused to transmit the signal to the relay unit. The relay unit is further configured to relay the signal to the receiver unit. The signal that is transmitted by the transmitter unit to the relay unit may be in a different format from the signal that is relayed by the relay unit to the receiver unit.

The relay unit may be further configured to (i) receive a plurality of signals, each signal received from a plurality of different invoked transmitter units and (ii) transmit, to the receiver unit, a collection signal corresponding to the plurality of signals; wherein the memory module having further stored thereon a collection of product data that is stored in association with a transmittable collection identity, and wherein the receiver unit is further configured to (i) convert the collection signal into its corresponding transmittable collection identity and (ii) retrieve the collection of product data from the memory module based on a comparison between the stored transmittable collection identity and the converted transmittable collection identity.

In an embodiment, the system may further comprise a computing device, wherein the computing device comprises the memory module and the computing device is in communication with the receiver unit.

In an embodiment, the receiver unit may be further configured to decode and/or demodulate the received signal for converting the received signal into its corresponding transmittable product identity.

In an embodiment, the product data may comprise one or more of: a description of the product, a price of the product, and a merchant who is offering the product.

In an embodiment, the signal may be a sound wave or an electromagnetic wave (e.g. a radio wave, UV wave or IR wave).

According to a second aspect, there is provided a method for facilitating user identification of a product, comprising: storing, in a memory module, product data in association with a transmittable product identity; and providing the product data based on a comparison between the stored transmittable product identity and a received transmittable product identity, wherein the received transmittable product identity is converted from a signal that is received by a receiver unit. The provided product data facilitates user identification of the product.

In an embodiment, the method may further comprise: storing, in the memory module, a collection of product data in association with a transmittable collection identity; and providing the collection of product data based on a comparison between the stored transmittable collection identity and a received transmittable collection identity, wherein the received transmittable collection identity is converted from a collection signal received by the receiver unit, wherein the receiver unit is in communication with a relay unit that is configured to transmit the collection signal to the receiver unit.

In an embodiment, the product data may be provided to an output unit that is configured to output the product data to a user for facilitating user identification of the product.

In an embodiment, the method may further comprise: storing an identity of an owner of the product in association with the transmittable product identity; and, upon receipt of the transmittable product identity, retrieving the identity of the owner of the product based on the received transmittable product identity.

In an embodiment, converting the received transmittable product identity from the received signal comprises decoding and/or demodulating the received signal into its corresponding transmittable product identity.

According to a third aspect, there is provided a system for facilitating user identification of a product, the system comprising: at least one processor; and at least one memory including computer program code; the at least one memory and the computer program code configured to, with at least one processor, cause the system at least to: store product data in association with a transmittable product identity in the at least one memory; and provide the product data based on a comparison between the stored transmittable product identity and a received transmittable product identity, wherein the received transmittable product identity is converted from a signal that is received by a receiver unit that is in communication with the system. The provided product data facilitates user identification of the product.

According to a fourth aspect, there is provided a non-transitory computer readable medium having stored thereon executable instructions for controlling a system for facilitating user identification of a product to perform steps comprising: storing product data in association with a transmittable product identity; and providing the product data based on a comparison between the stored transmittable product identity and a received transmittable product identity, wherein the received transmittable product identity is converted from a signal that is received by a receiver unit, wherein the provided product data facilitates user identification of the product.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1A:
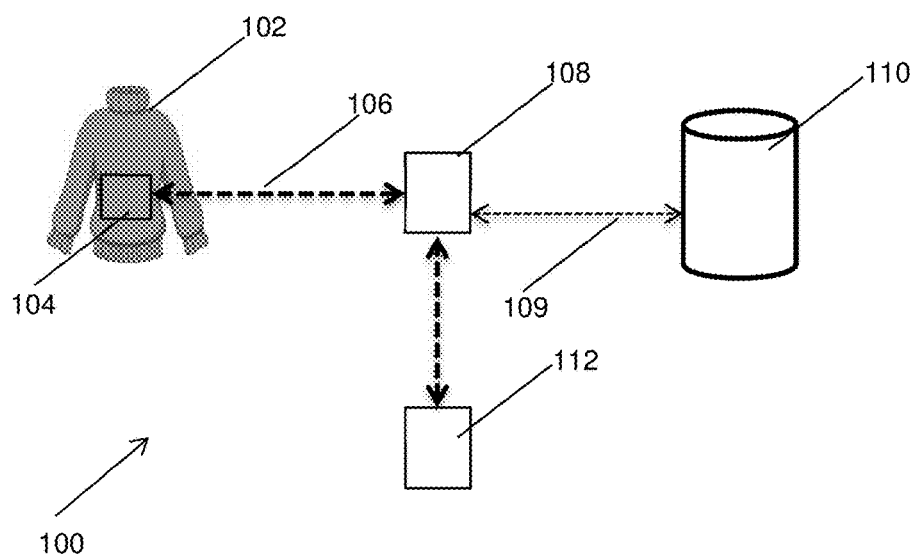
FIGS. 1a and b show schematics of a system for facilitating user identification of a product according to an example embodiment.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "retrieving", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

FIGS. 1a and b show schematics of a system 100 for facilitating user discovery and identification of a product 102 according to an example embodiment. The system 100 may comprise a transmitter unit 104 that is coupled to the product 102 and configured to broadcast/transmit a signal (e.g. signal 106 in FIG. 1a or signal 105 in FIG. 1b). The signal may be a sound wave or an electromagnetic wave (e.g. radio wave, UV wave or IR wave). In the case of the signal being a radio wave, in an implementation, the transmitter unit 104 is a Bluetooth low energy (BLE) transmitter and the radio signal is a BLE radio signal. In another implementation, the transmitter unit 104 is a radio-frequency identification (RFID) transmitter or tag and the radio signal is a radio-frequency signal. The transmitter unit 104 may be capable of other forms of wireless communication such as Near Field Communication (NFC), WiFi-direct, infrared, etc.

In an implementation, there are two different operating modes (a self-broadcasting mode and an intermediator-broadcasting mode) for the transmitter unit 104, depending on the capability of the transmitter unit 104. If the transmitter unit 104 is a passive unit (i.e. it is not capable of broadcasting signals on its own, e.g. NFC/passive RFID), the transmitter unit 104 operates only in the intermediator-broadcasting mode, and leverages on an intermediary device's capability to execute the broadcast. If the transmitter unit 104 is an active unit (i.e. it is capable of broadcasting signals on its own, e.g. BLE devices), the transmitter unit 104 can operate in either the intermediator-broadcasting mode or self-broadcasting mode. The choice of operating mode for an active unit depends on the intermediary device's instruction. If the intermediary device's instruction is not available (either the intermediary device is not available or does not give any instruction to the transmitter unit 104), or the intermediary device's instruction is to set the operating mode to self-broadcasting for the transmitter unit 104, the transmitter unit 104 operates in the self-broadcasting mode. If the intermediary device's instruction is to set the mode to the intermediator-broadcasting mode, the transmitter unit 104 operates in the intermediator-broadcasting mode.

In FIG. 1a, the transmitter unit 104 is operating in the self-broadcasting mode. This mode is preferred for BLE, WiFi/WiFi direct, active RFID, etc. The system 100 also comprises a receiver unit 108 configured to receive the signal 106 (which may be a sound wave or an electromagnetic wave) when in communication with the transmitter unit 104. For example, when the receiver unit 108 is brought within proximity/range of the transmitter unit 104, communication is established. Suitable authentication, handshake and/or pairing procedures may be initiated, if necessary, between the transmitter unit 104 and the receiver unit 108.

The transmitter unit 104 is coupled to the product 102 so that the transmitter unit 104 can be associated/linked with the product 102. In this manner, a user wishing to identify the product 102 has to bring the receiver unit 108 within proximity/range of the product 102 (and consequently within range of the transmitter unit 104).

The system 100 also comprises a memory module 110 that is in communication with the receiver unit 108. The memory module 110 stores data corresponding to the product (i.e. "product data"). The product data includes, but is not limited to, a description of the product (colour, shape, material, model name, manufacturer, key features, etc.), a price of the product, and merchant(s) who is/are offering the product for sale (name of merchant, address of merchant's store, address of merchant's web-store, etc.).

In an implementation, each signal is unique to a transmitter unit, and therefore a product, so that each signal can be used as a means to uniquely identify a product.

Alternatively, in another implementation, each signal is unique to a product model. That is, the same product model has the same signal. In this manner, the signal can also be used as a means to uniquely identify all products of a specific model.

Figure 1B:
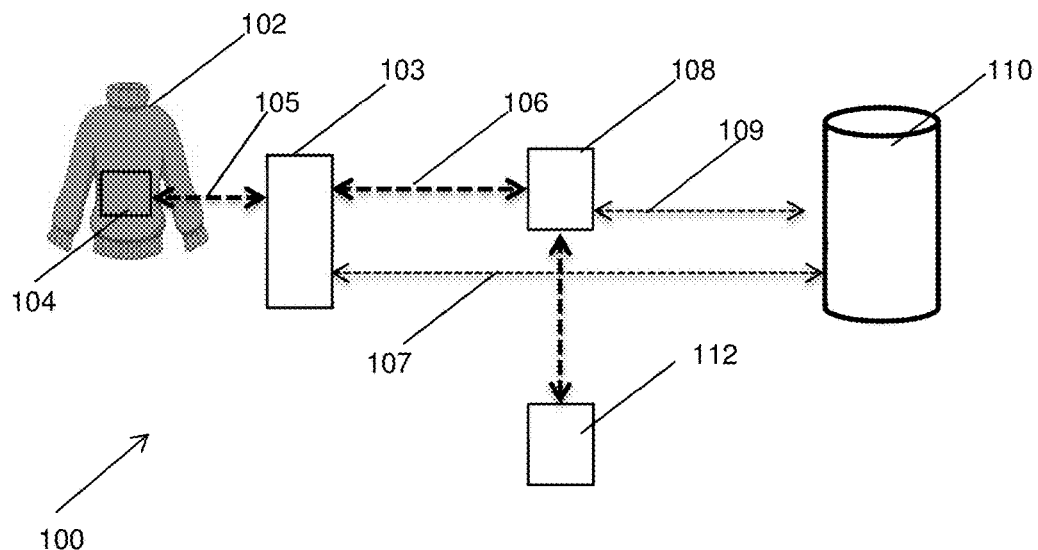

In FIG. 1b, the transmitter unit 104 is operating in the intermediator-broadcasting mode. This mode is preferred for NFC, passive RFID, etc., but can also be implemented using BLE, WiFi/WiFi direct, active RFID. In the intermediator-broadcasting mode, an intermediary device such as a relay unit 103 can be used to receive the signal 105 from transmitter unit 104 that is coupled to product 102. The relay unit 103 is capable of invoking the transmitter unit 104 in order to receive signals from the transmitter unit 104. After that, assuming that the relay unit 103 is within range and in communication with the receiver unit 108, the relay unit 103 is able to relay/transmit the signal 106 to the receiver unit 108 in order to retrieve the product data. The signal 105 that is transmitted by the transmitter unit 104 to the relay unit 103 may be in a different format/technology/media from the signal 106 that is relayed by the relay unit 103 to the receiver unit 108. For example, the transmitter unit 104 may be a NFC tag so the signal 105 from the NFC tag to the relay unit 103 is a radio signal, while the signal 106 relayed by the relay unit 103 to the receiver unit 108 may be a sound wave. As another example, the transmitter unit 104 may be a NFC tag so the signal 105 from the NFC tag to the relay unit 103 is a radio signal, while the signal 106 is transmitted from the relay unit 103 to the receiver unit 108 via BLE.

In memory module 110, product data is stored in association with its corresponding transmittable product identity. That is, a signal that is unique to a particular product/model is indirectly linked to the data corresponding to the particular product/model via the transmittable product identity.

With reference to both FIGS. 1a and b, regardless whether the transmitter unit 104 is operating in the self-broadcasting mode or the intermediator-broadcasting mode, the receiver unit 108 is configured to (i) convert the received signal into its corresponding transmittable product identity and also to (ii) retrieve 109 the product data from the memory module 110 based on a comparison between the stored transmittable product identity and the converted transmittable product identity. The received signal 106, which may be an analog signal, is converted (e.g. using an analog-to-digital converter in the receiver unit 108) into digital data (i.e. a transmittable product identity). The conversion process may include decoding and/or demodulating the received signal to recover/obtain its corresponding transmittable product identity. The receiver unit 108 is configured to retrieve the product information from the memory module 110 based on a comparison between the stored transmittable product identity and the converted transmittable product identity. For example, using a "look-up" procedure, the receiver unit 108 accesses the memory module 110 and searches for the transmittable product identity that matches the converted transmittable product identity. The product data linked to the matched transmittable product identity is retrieved).

The system 100 also comprises an output unit 112 which is either in communication with the receiver unit 108 or in communication with the relay unit 103 and configured to output the retrieved product data to a user for facilitating user identification of the product and display the relevant product information.

In the event that there are two or more transmitters in close proximity (e.g. someone wears a shirt with a first transmitter unit and pants with a second transmitter unit), there may be multiple signals being transmitted/broadcasted and received by the receiver unit. As a result, product data of more than one product may be retrieved and displayed at the output unit. As the product data is expected to clearly describe its product, the user is able to differentiate which product data corresponds to which product even though multiple product data may be displayed at the output unit.

The system 100 may comprise a wireless electronic device (or any electronic device with data connectivity) such as a mobile phone or a mobile tablet computer. An exemplary wireless electronic device will be described in more detail below. The wireless electronic device may comprise both the receiver unit 108 and output unit 112. The output unit 112 may include a display screen capable of displaying a user interface showing the product data. The wireless electronic device may further comprise a user input module (e.g. keypad, touchscreen, etc.) configured to allow the user to instruct the receiver unit 108 to retrieve the product data from the memory module 110.

In an implementation, the memory module 110 may be part of a computing device/server that is physically situated at another location. The receiver unit 108 is in communication with the computing device/server through suitable protocols, e.g. mobile telecommunications technology, wireless communication protocols, etc.

It will be appreciated that cloud-computing architecture can be used to implement one or more components of the system 100. For example, the memory module 110 may be implemented as a cloud storage data module.

Turning back to FIG. 1*b*, in the intermediator-broadcasting mode, relay unit 103 can relay a signal for each product individually ("Option A"), or relay a collection signal to represent a collection of products ("Option B"). For Option A, the product data may be pre-registered by a product manufacturer or brand owner and stored in the memory module 110. After the receiver unit 108 receives the signal 106 from the relay unit 103, the receiver unit 108 converts the received signal into its corresponding transmittable product identity and retrieves 109 the product data stored in the memory module 110 based on a comparison between the stored transmittable product identity and the converted transmittable product identity. For Option B, the relay unit 103 creates a collection signal that corresponds to a plurality of signals transmitted by a number of different invoked transmitter units (e.g. transmitter unit 104). The collection signal is stored in the memory module 110 in association with the product data of all the products in the collection. A unique transmittable collection identity can be assigned to the collection and is also stored in the memory module 110. More than one collection can be maintained in the memory module 110. This advantageously allows users to retrieve 109 product data related to a collection of products at once (for example, a collection of matching shirt, pants, accessories and footwear). The relay unit 103 can create, modify, or delete the collection that is registered in the memory module 110 (see data flow 107).

In an example implementation, the relay unit 103 is configured to (i) receive a plurality of signals, each signal received from a plurality of different invoked transmitter units (e.g. transmitter unit 104) and (ii) transmit, to the receiver unit 108, a collection signal corresponding to the plurality of signals. The memory module 110 contains a collection of product data that is stored in association with a transmittable collection identity. The receiver unit 108 is configured to (i) convert the collection signal into its corresponding transmittable collection identity and (ii) retrieve the collection of product data from the memory module 110 based on a comparison between the stored transmittable collection identity and the converted transmittable collection identity.

Figure 2:
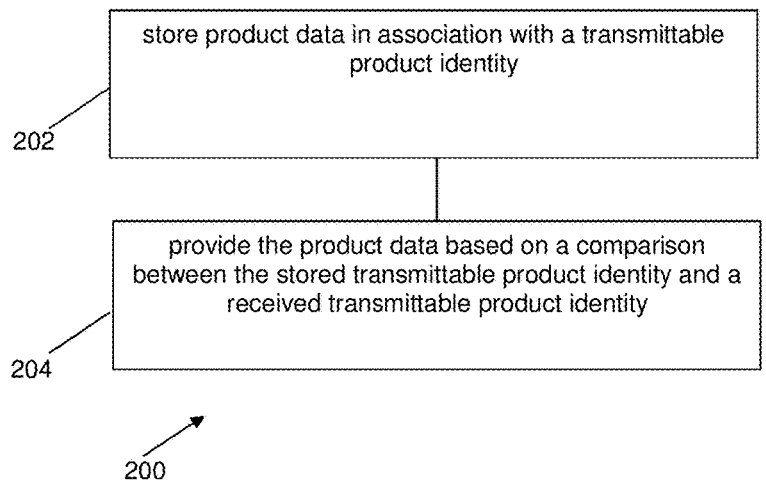
FIG. 2 shows a flow chart of a method for facilitating user identification of a product according to an example embodiment.

FIG. 2 shows a flow chart of a method 200 for facilitating user identification of a product according to an example embodiment. The method 200 comprises the step 202 of storing (e.g. in a memory module) product data in association with a transmittable product identity. The product data includes, but is not limited to, a description of the product (colour, shape, material, model name, manufacturer, key features, etc.), a price of the product, and merchant(s) who is/are offering the product for sale (name of merchant, address of merchant's store, address of merchant's webstore, etc.). The transmittable product identity is unique to each physical product or product model, and can be used as a means to uniquely identify a product.

The method 200 also comprises the step 204 of providing the product data based on a comparison between the stored transmittable product identity and a received transmittable product identity. The received transmittable product identity is converted from a signal that is received by a receiver unit. The receiver unit may be in direct communication or indirect communication (i.e. via a relay unit) with a transmitter unit that is coupled to the product and configured to transmit/broadcast the signal. The receiver unit may be in communication with the transmitter unit via a Bluetooth low energy (BLE) communication protocol or a radio-frequency identification (RFID) communication protocol. The provided product data facilitates user identification of the product. In an implementation, the receiver unit may retrieve the product data from a remote database by providing the transmittable product identity.

The product data may be provided to an output unit that is in direct communication or indirect communication (e.g. via the relay unit) with the receiver unit. The output unit (e.g. a display screen) is configured to output the product data to a user for facilitating user identification of the product. That is, the description of the product (colour, shape, material, model name, manufacturer, key features, etc.), price of the product, and merchant(s) who is/are offering the product for sale (name of merchant, address of merchant's store, address of merchant's web-store, etc.) can be displayed on the display screen so that a user who is looking at the display screen is able to identify and know more about the product.

In an implementation, the method may further include the steps of: storing (e.g. in the memory module) a collection of product data in association with a transmittable collection identity; and providing the collection of product data based on a comparison between the stored transmittable collection identity and a received transmittable collection identity. The received transmittable collection identity is converted from a collection signal received by the receiver unit, wherein the receiver unit is in communication with a relay unit that is configured to transmit the collection signal to the receiver unit.

Figure 3:
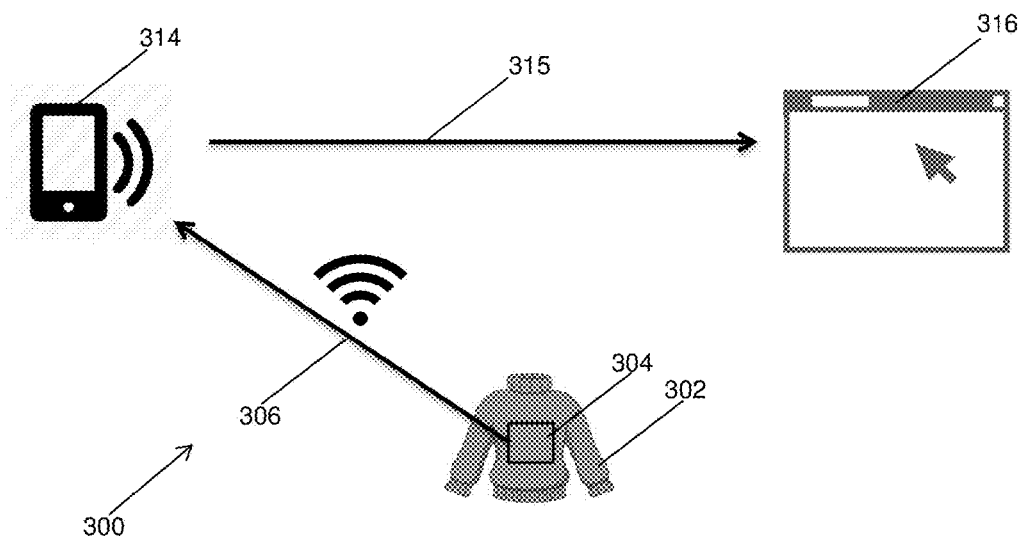
FIG. 3 shows a schematic diagram illustrating flow of information during a product identification/discovery procedure according to an example embodiment.

FIG. 3 shows a schematic diagram illustrating flow of information during a product identification/discovery procedure 300 according to an example embodiment. A transmitter unit 304 that is coupled to a product 302 is configured to transmit/broadcast a signal 306. The transmitter unit 304 may be a Bluetooth low energy (BLE) transmitter and the signal 306 is a BLE radio signal. Alternatively, the transmitter unit 304 may be a radio-frequency identification (RFID) transmitter or tag and the signal 306 is a radio-frequency signal. A wireless electronic device 314 (e.g. a mobile phone or a mobile tablet computer), comprising a receiver unit, is configured to receive the signal 306 when in communication with the transmitter unit 304. The transmitter unit 304 can be configured to operate in a number of different modes, e.g. continuous transmission or user-initiated transmission. In the continuous transmission mode, the transmitter unit 304 is configured to continuously broadcast the signal. In the user initiated transmission mode, a user can select when to broadcast the signal.

In an example scenario, a user sees someone wearing a jacket that he/she is interested in and wishes to identify the jacket and find out more about the jacket. The user brings his wireless electronic device 314 within proximity of the jacket (i.e. product 302). Communication is initiated between the wireless electronic device 314 and the transmitter unit 304 that is attached to the jacket. The transmitter unit 304 broadcasts the signal 306 and the wireless electronic device 314 receives the signal 306. The signal 306 is unique to the transmitter unit 304, and therefore the product 302, so that the signal 306 can be used as a means to uniquely identify the product 302.

The wireless electronic device 314 connects to an online platform 316 via a suitable communication protocol. The online platform 316 may be hosted on a server and the server comprises a database that stores, among other information, product data in association with a transmittable product identity. The online platform 316 may be hosted on a cloud-computing based server.

The wireless electronic device 314 processes the received signal 306 (e.g. converts the received signal into its corresponding transmittable product identity) and transmits 315 the transmittable product identity to the online platform 316. Based on a comparison between the transmittable product identity that is stored on the online platform 316 and the converted transmittable product identity, the online platform 316 retrieves the corresponding product data. The retrieved product data is sent from the online platform 316 to the wireless electronic device 314. The wireless electronic device 314 outputs the retrieved product data so that the user is able to identify and find out more about the product.

There may be other procedures related to the product identification/discovery procedure 300. Some of these other procedures will now be described.

Figure 4A:
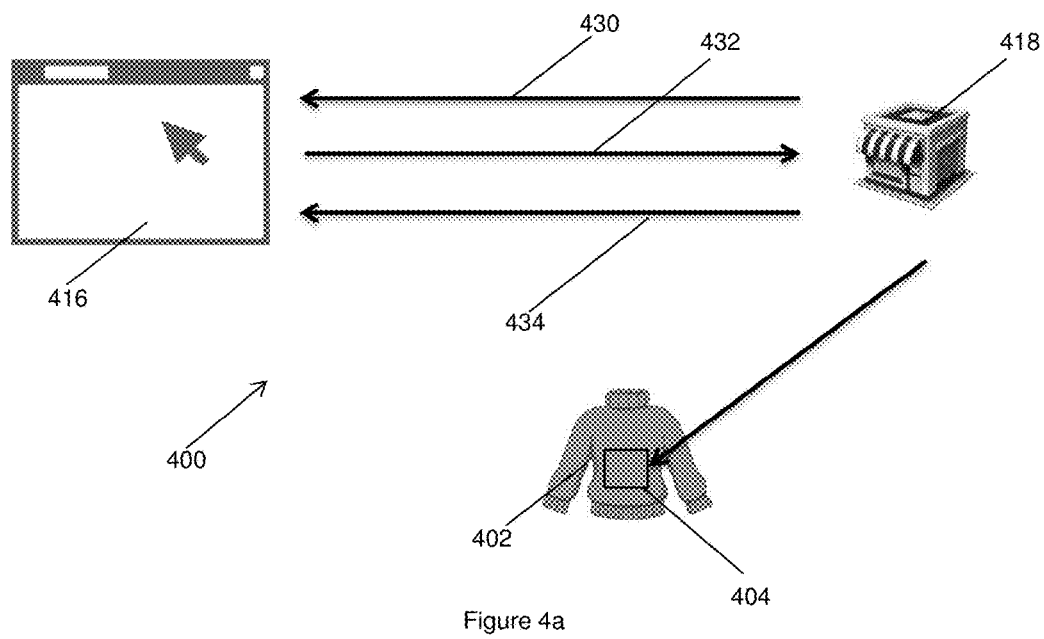
FIG. 4a shows a schematic diagram illustrating flow of information during a manufacturer/brand owner registration procedure according to an example embodiment.

Prior to product identification/discovery by a user, a registration procedure may be carried out. FIG. 4a shows a schematic diagram illustrating flow of information during a manufacturer/brand owner registration procedure 400 according to an example embodiment. Firstly, a manufacturer or brand owner (or any other party) 418 registers itself 430 with the online platform 416. Some relevant information may be required for registration of the manufacturer or brand owner 418 with the online platform 416 (e.g. name, address and contact details of the manufacturer or brand owner 418).

Upon successful registration of the manufacturer or brand owner 418, the online platform 416 provides 432 the manufacturer or brand owner 418 with a unique company identity and information regarding transmitter units (e.g. format of the transmitter units). The manufacturer or brand owner 418 subsequently registers 434 each transmitter unit (product tag) that is to be attached to its products with the platform 416.

Some relevant information may be required for registration 434 of each transmitter unit (product tag). Examples of the relevant information include:
 (i) unique company identity assigned to the manufacturer or brand owner 418;
 (ii) product data, e.g. description of the product (colour, shape, material, model name, manufacturer, key features, etc.), price of the product, and merchant's details (name of merchant, address of merchant's store, address of merchant's web-store, etc.); and
 (iii) transmitter unit information such as the unique signal of the transmitter unit.

The relevant information is captured by the online platform 416 and stored in a database. The product data is indirectly linked to the unique signal via the transmittable product identity that is stored in the database so that the product data can be retrieved if the unique signal is known.

The registered transmitter unit 404 is attached to the corresponding product 402. Each product offered by the manufacturer or brand owner is assigned a transmitter unit (product tag). In other words, two identical products (i.e. same brand, model, colour, size) may be assigned a different transmitter unit (product tag) which broadcasts a different signal. As such, there can be two different signals corresponding to the same product data if the product is identical.

Alternatively, signals may be the same across a product base. That is, products of the same model have the same signal. In such an implementation, transmitter units attached to products of the same model are configured to broadcast the same signal.

Figure 4B:
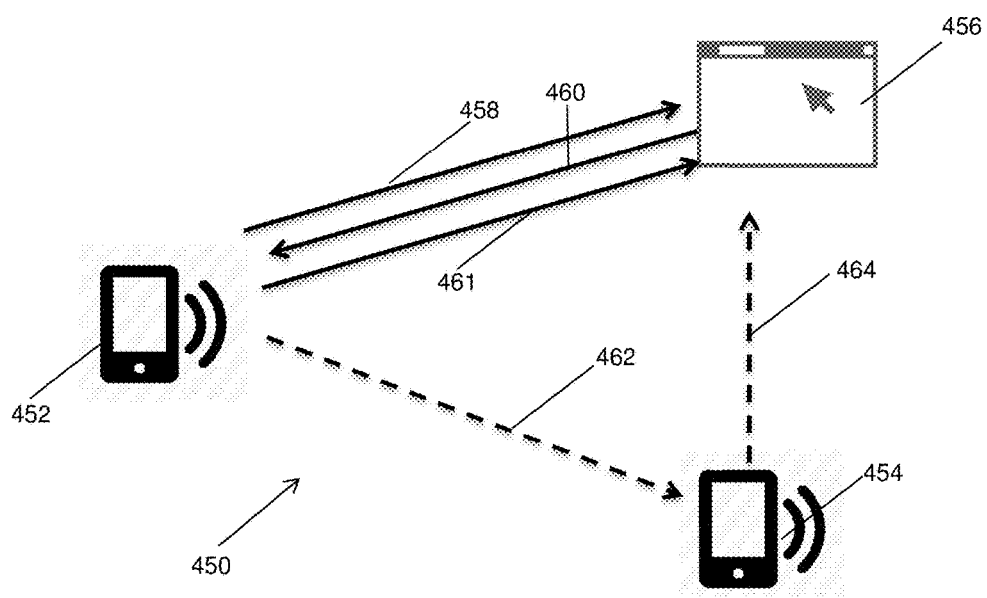
FIG. 4b shows a schematic diagram illustrating flow of information during a product owner registration procedure according to an example embodiment.

FIG. 4b shows a schematic diagram illustrating flow of information during a product owner registration procedure 450 according to an example embodiment. The "product owner" refers to someone who owns a product and allows others to identify the product. The product owner may receive incentives for allowing others to identify the product. Details on the provision of incentives to product owners for allowing others to identify their product will be described in more detail below.

The product owner uses a mobile application installed on his/her wireless electronic device 452 to create a persona/user profile. In an example implementation, the wireless electronic device 452 connects 458 to an online platform 456 which is preferably the same platform as online platform 416. The online platform 456 is configured to return 460 a persona/user profile (identity) ID. The product owner can use his/her assigned user profile ID to register a product (that he/she wishes to allow others to identify) with the online platform 456.

Product registration may be accomplished by the product owner using the mobile application to provide 461 to the online platform 456 at least his/her assigned user profile ID and the transmittable product identity of the product that is to be registered. The transmittable product identity corresponds to (i.e. can be converted from) the signal that is associated with the product to be registered. The product owner can use the mobile application installed on his/her wireless electronic device 452 to communicate with the transmitter unit coupled to the product in order to obtain the transmittable product identity.

The online platform 456 is configured to store, on a database: (i) a list of product owners (and their corresponding personas/user profiles and IDs), and (ii) product(s) registered by the product owners (and the transmittable product identities associated with each registered product). The user profile IDs may be stored in association with the relevant transmittable product identities. The wireless electronic device 452, having received 460 the persona/user profile ID, can be configured to broadcast 462 the persona/user profile ID to users who wish to identify the product. The persona/user profile ID may be broadcasted, for example, by way of a signal.

During a product identification/discovery procedure (similar to procedure 300. described above), users utilize their wireless electronic device 454 to receive a signal from a transmitter that is coupled to the product that they wish to identify. The signal is converted to its corresponding transmittable product identity. The product data can be retrieved based on a comparison between the stored transmittable product identity and the converted transmittable product identity for facilitating user identification of the product. At the same time, the online platform 456 is able to identify the owner of the product (e.g. based on a "look-up" procedure) since the online platform 456 has a record of owners, their registered products, and the transmittable product identities associated with the registered products. The owner may be provided with incentives for allowing his/her product to be identified.

In another implementation, if the product owner is broadcasting 462 (shown in dashed lines since this step is not part of the product owner registration procedure 450) his/her persona/user profile ID, the wireless electronic device 454 may receive the persona/user profile ID. During product information retrieval 464 (shown in dashed lines since this step is also not part of the product owner registration procedure 450) from the online platform 456, the wireless electronic device 454 may also transmit the persona/user profile ID to the online platform 456. In this manner, the owner of the product can be identified based on the persona/user profile ID that is received. The owner may be provided with incentives for allowing his/her product to be identified.

Figure 5:
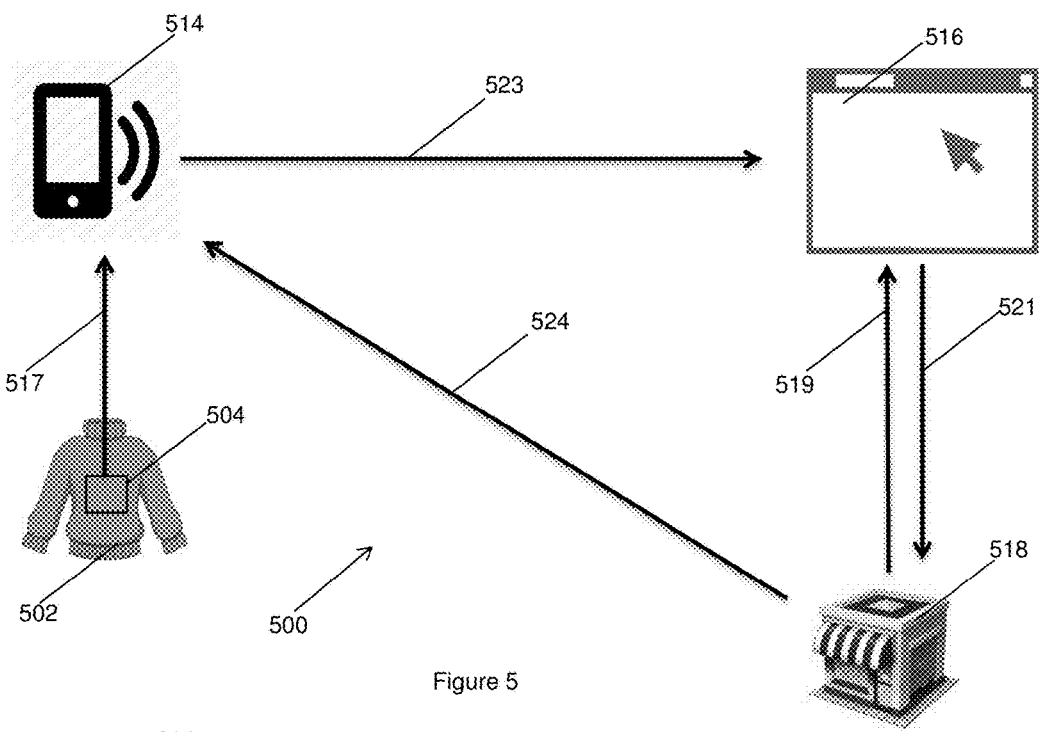
FIG. 5 shows a schematic diagram illustrating flow of information during a product purchase procedure according to an example embodiment.

FIG. 5 shows a schematic diagram illustrating flow of information during a product purchase procedure 500 according to an example embodiment. It is assumed that a merchant or brand owner 518 has already registered 519 the products for sale on an online platform 516. The registration step 519 may be similar to the registration procedure 400 described above. The merchant or brand owner 518 provides relevant information for registration of the products such as (i) description of product (e.g. colour, shape, material, model name, manufacturer, key features, etc.), (ii) price of the product, (iii) name of merchant, (iv) address of merchant's store/address of merchant's web-store, and (iv) unique signal(s)/transmittable product identities of the transmitter unit(s) that are associated with the product(s) offered for sale by the merchant or brand owner 518.

Thereafter, if a user is interested in a product 502 that he sees and wishes to identify the product 502, he/she can use a wireless electronic device 514 to receive information about the product. The product identification procedure 517 can be similar to the product identification/discovery procedure 300. After the user identifies the product 502, the user can use the wireless electronic device 514 to purchase the product 502 (or variants of the product, or any related product). The wireless electronic device 514 connects 523 to the online platform 516 via any suitable communication protocol. The online platform 516 is capable of facilitating the purchase of the product.

If the user confirms that he/she wishes to purchase the product, the online platform 516 notifies 521 the merchant or brand owner 518 to fulfil the transaction. Existing procedures known in the art can be used to fulfil the transaction. The merchant or brand owner 518 releases 524 the product 502 to the user.

Figure 6:
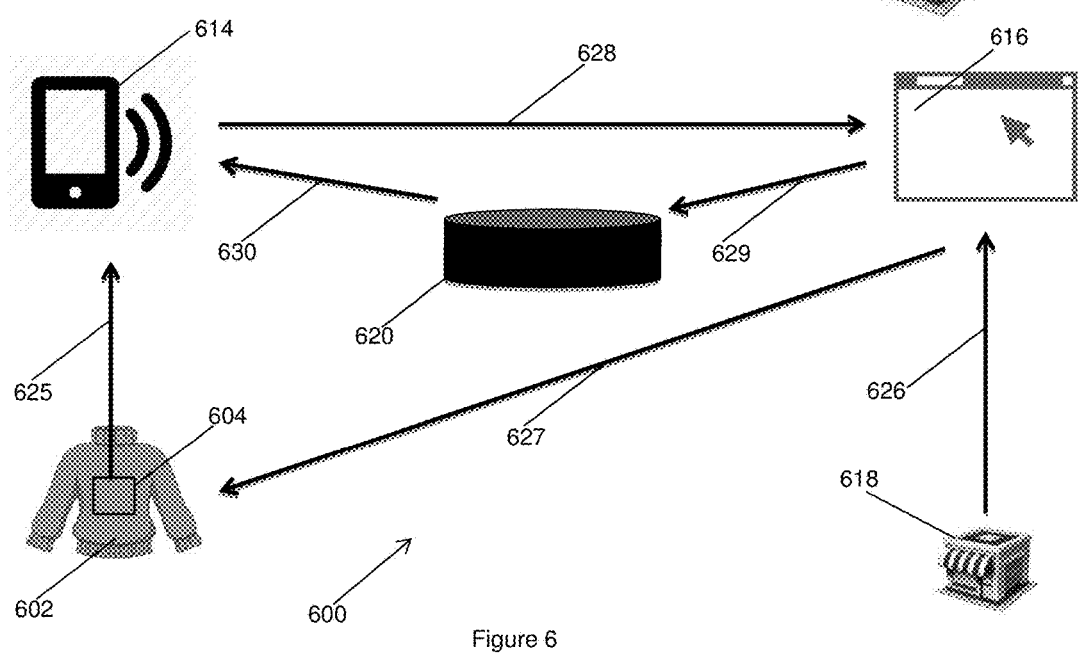
FIG. 6 shows a schematic diagram illustrating flow of information during a product display procedure according to an example embodiment.

FIG. 6 shows a schematic diagram illustrating flow of information during a product display procedure 600 according to an example embodiment. A merchant or brand owner 618 provides incentives for a product owner to broadcast a signal. For example, incentives such as discount coupons and loyalty rewards can be given to a product user if he chooses to broadcast 625 the signal from the transmitter unit 604 that is attached to the jacket 602 that he is wearing.

The merchant or brand owner 618 uploads 626 the incentives to an online platform 616. If a product user broadcasts the signal from his/her transmitter unit that is attached to his/her product, the online platform 616 sends 627 the incentive to the user. FIG. 4b and the corresponding description provide details on the product owner registration procedure and how an identified product can be linked to its owner. If the owner of an identified product is known, the online platform 616 can send the incentive to the product owner. In an implementation, the incentive is sent 627 in the form of a digital coupon/ticket from the online platform 616 to the product user's mobile electronic device (not shown in FIG. 6). In an implementation, the criteria to send the incentive to the product owner can be customized by the merchant or brand owner 618. It can be based on (but not limited to): how many times the product is discovered by other users, or how many users show interests in the product, or how many times people purchase the product after discovering the product from the product owner.

If someone (a consumer) takes an interest in the product (e.g. jacket 602) that the product user possesses, and assuming that the product user is broadcasting 625 the signal from the transmitter unit 604 that is attached to the jacket 602, the consumer is able to use his wireless electronic device 614 to communicate with the transmitter unit 604 to receive the broadcasted signal in order to identify/discover the product. After identification/discovery, the consumer can use his wireless electronic device 614 to connect to the online platform 616 and indicate 628 that he has taken an interest in the jacket and wishes to buy the jacket in the future (i.e. add to his/her "wish-list" or online shopping cart).

A recommendation engine 620 that is in communication with the online platform 616 can be configured to collect 629 relevant data regarding the consumer (e.g. details of the consumer, details on the product that the consumer has taken an interest in, and/or the consumer's intention to purchase the product in the future). The recommendation engine 620 can be implemented using a computer system which will be described in more detail below. The recommendation engine 620 can be programmed with fuzzy logic or configured for machine-learning so that certain inputs (e.g. the relevant data regarding the consumer that is collected) can return appropriate outputs 630 (e.g. relevant offers that may be related to the product that the consumer has taken an interest in and/or offers that are expected to appeal to the consumer based on his profile).

In an implementation, the online platform 616 may be further configured to allow users to "share", on their social network (e.g. Facebook, Twitter, Pinterest, Instagram, etc.), the products that they are wearing or possess. Their friends/followers on their social network can comment, "like" or purchase the products based on the virtual presence of the product. In this manner, the user acts as a medium for merchants or brand owners to advertise or market their products.

Figure 7:
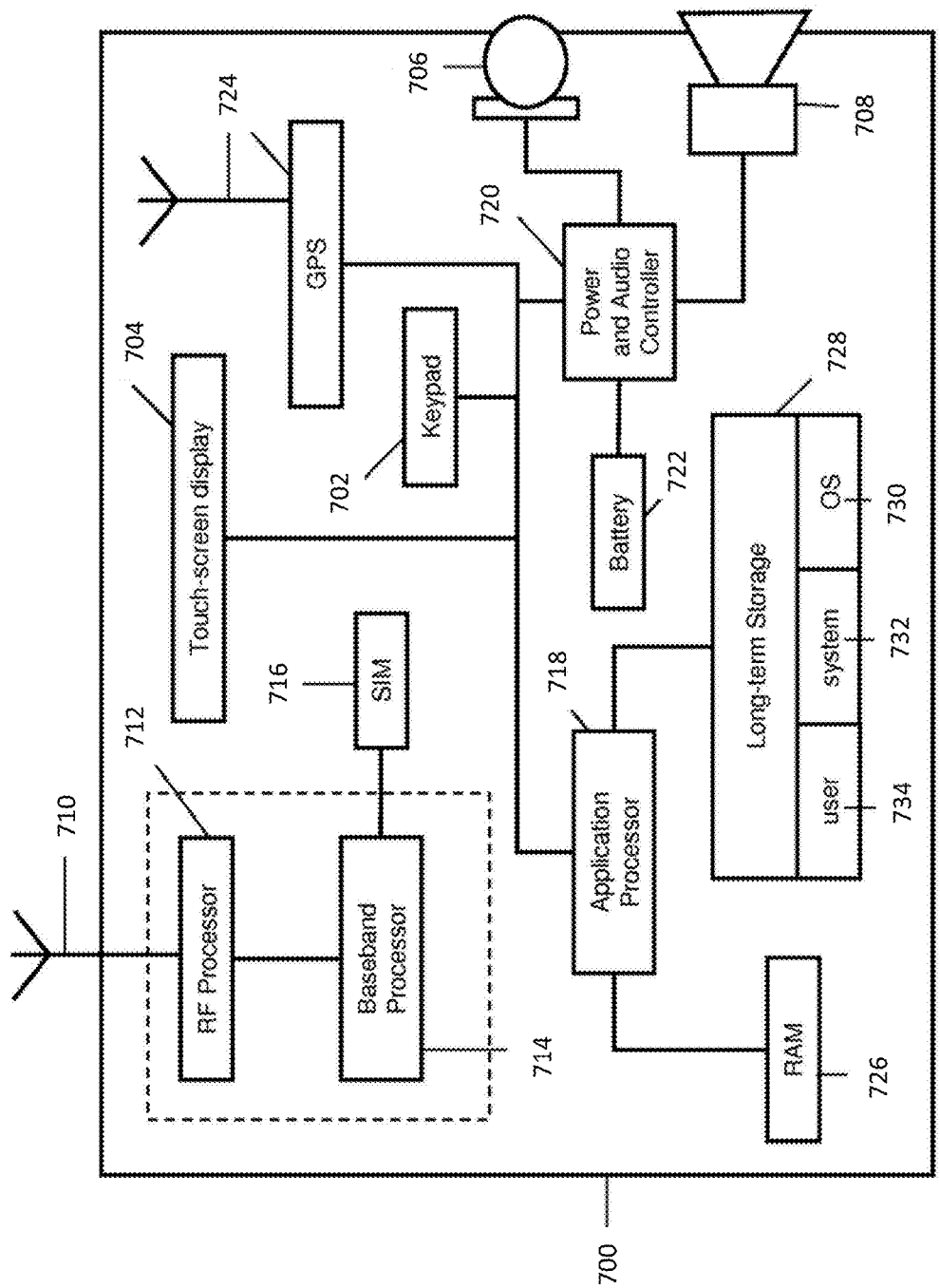
FIG. 7 shows a schematic diagram of a wireless device suitable for use in the example embodiments.

FIG. 7 shows a schematic of an exemplary wireless computing device 700 that may be utilized to implement the wireless electronic device of the system 100 and/or wireless electronic devices 314/514/614.

The wireless device 700 comprises a keypad 702 (which may function as the user input module described above), a touch-screen 704 (which may function as the user input module and/or the output unit 112 described above), a microphone 706, a speaker 708 and an antenna 710. The wireless device 700 is capable of being operated by a user to perform a variety of different functions, such as, for example, hosting a telephone call, sending an SMS message, browsing the Internet, sending an email and providing satellite navigation.

The wireless device 700 comprises hardware to perform communication functions (e.g. telephony, data communication), together with an application processor and corresponding support hardware to enable the wireless device 700 to have other functions, such as, messaging, Internet browsing, email functions and the like. The communication hardware is represented by a radio frequency (RF) processor 712 which provides an RF signal to the antenna 710 for the transmission of data signals, and the receipt therefrom. Additionally provided is a baseband processor 714, which provides signals to and receives signals from the RF Processor 712. The baseband processor 714 also interacts with a subscriber identity module (SIM) 716, as is well known in the art. The communication subsystem enables the wireless device 700 to communicate via a number of different communication protocols including 3G, 4G, GSM, WiFi, RFID, Bluetooth™, Bluetooth™ low energy (BLE) and/or CDMA. The communication subsystem of the wireless device 700 is beyond the scope of the present invention. However, the communication subsystem preferably allows communication with transmitter units used in embodiments of the invention as described above.

The keypad 702 and the touch-screen 704 are controlled by an application processor 718. A power and audio controller 720 is provided to supply power from a battery 722 to the communication subsystem, the application processor 718, and the other hardware. The power and audio controller 720 also controls input from the microphone 706, and audio output via the speaker 708. Also provided is a global positioning system (GPS) antenna and associated receiver element 724 which is controlled by the application processor 718 and is capable of receiving a GPS signal for use with a satellite navigation functionality of the wireless device 700.

In order for the application processor 718 to operate, various different types of memory are provided. Firstly, the wireless device 700 includes Random Access Memory (RAM) 726 connected to the application processor 718 into which data and program code can be written and read from at will. Code placed anywhere in RAM 726 can be executed by the application processor 718 from the RAM 726. RAM 726 represents a volatile memory of the wireless device 700.

Secondly, the wireless device 700 is provided with a long-term storage 728 connected to the application processor 718. The long-term storage 728 comprises three partitions, an operating system (OS) partition 730, a system partition 732 and a user partition 734. The long-term storage 728 represents a non-volatile memory of the wireless device 700.

In the present example, the OS partition 730 contains the firmware of the wireless device 700 which includes an operating system. Other computer programs may also be stored on the long-term storage 728, such as application programs (also referred to as apps), and the like. In particular, application programs which are mandatory to the wireless device 700, such as, in the case of a smartphone, communications applications and the like are typically stored in the system partition 732. The application programs stored on the system partition 732 would typically be those which are bundled with the wireless device 700 by the device manufacturer when the wireless device 700 is first sold.

Application programs which are added to the wireless device 700 by the user would usually be stored in the user partition 734.

As stated, the representation of FIG. 7 is schematic. In practice, the various functional components illustrated may be substituted into one and the same component. For example, the long-term storage 728 may comprise NAND flash, NOR flash, a hard disk drive or a combination of these.

Figure 8:
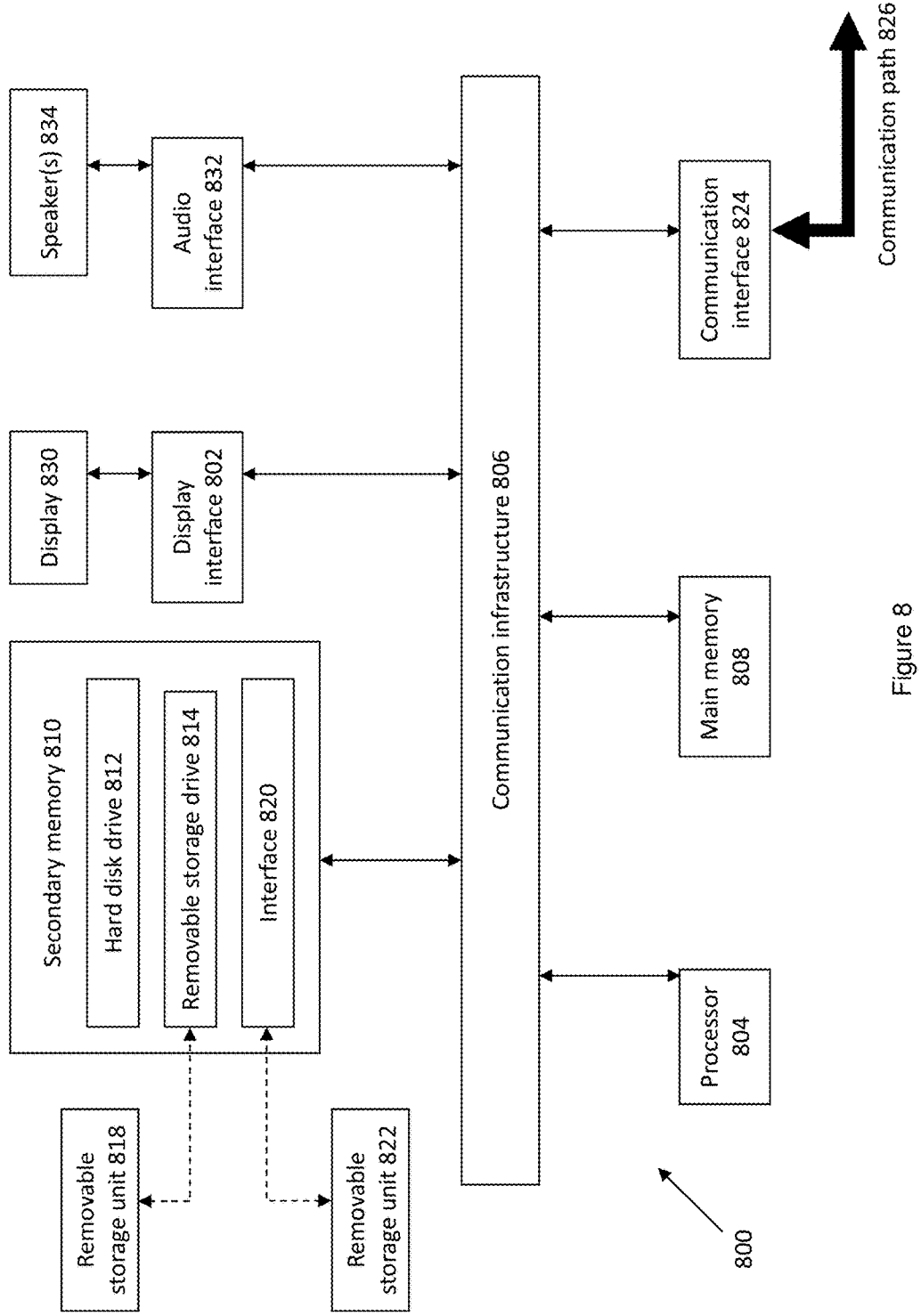
FIG. 8 shows a schematic diagram of a computer system suitable for use in the example embodiments.

FIG. 8 depicts an exemplary computing device 800, hereinafter interchangeably referred to as a computer system 800, where one or more such computing devices 800 may be used for the computing device/server of system 100 and/or recommendation engine 620. The following description of the computing device 800 is provided by way of example only and is not intended to be limiting.

As shown in FIG. 8, the example computing device 800 includes a processor 804 for executing software routines. Although a single processor is shown for the sake of clarity, the computing device 800 may also include a multi-processor system. The processor 804 is connected to a communication infrastructure 806 for communication with other components of the computing device 800. The communication infrastructure 806 may include, for example, a communications bus, cross-bar, or network.

The computing device 800 further includes a main memory 808, such as a random access memory (RAM), and a secondary memory 810. The secondary memory 810 may include, for example, a hard disk drive 812 and/or a removable storage drive 814, which may include a magnetic tape drive, an optical disk drive, or the like. The secondary memory 810 may be used to store product data and corresponding signals (transmittable product identities). The removable storage drive 814 reads from and/or writes to a removable storage unit 818 in a well-known manner. The removable storage unit 818 may include a magnetic tape, optical disk, or the like, which is read by and written to by removable storage drive 814. As will be appreciated by persons skilled in the relevant art(s), the removable storage unit 818 includes a computer readable storage medium having stored therein computer executable program code instructions and/or data.

In an alternative implementation, the secondary memory 810 may additionally or alternatively include other similar means for allowing computer programs or other instructions to be loaded into the computing device 800. Such means can include, for example, a removable storage unit 822 and an interface 820. Examples of a removable storage unit 822 and interface 820 include a program cartridge and cartridge interface (such as that found in video game console devices), a removable memory chip (such as an EPROM or PROM) and associated socket, and other removable storage units 822 and interfaces 820 which allow software and data to be transferred from the removable storage unit 822 to the computer system 800.

The computing device 800 also includes at least one communication interface 824. The communication interface 824 allows software and data to be transferred between computing device 800 and external devices via a communication path 826. In various embodiments of the inventions, the communication interface 824 permits data to be transferred between the computing device 800 and a data communication network, such as a public data or private data communication network. The communication interface 824 may be used to exchange data between different computing devices 800 which such computing devices 800 form part an interconnected computer network. Examples of a communication interface 824 can include a modem, a network interface (such as an Ethernet card), a communication port, an antenna with associated circuitry and the like. The communication interface 824 may be wired or may be wireless. Software and data transferred via the communication interface 824 are in the form of signals which can be electronic, electromagnetic, optical or other signals capable of being received by communication interface 824. These signals are provided to the communication interface via the communication path 826.

As shown in FIG. 8, the computing device 800 further includes a display interface 802 which performs operations for rendering images to an associated display 830 and an audio interface 832 for performing operations for playing audio content via associated speaker(s) 834.

As used herein, the term "computer program product" may refer, in part, to removable storage unit 818, removable storage unit 822, a hard disk installed in hard disk drive 812, or a carrier wave carrying software over communication path 826 (wireless link or cable) to communication interface 824. Computer readable storage media refers to any non-transitory tangible storage medium that provides recorded instructions and/or data to the computing device 800 for execution and/or processing. Examples of such storage media include magnetic tape, CD-ROM, DVD, Blu-ray™ Disc, a hard disk drive, a ROM or integrated circuit, USB memory, a magneto-optical disk, or a computer readable card such as a SD card and the like, whether or not such devices are internal or external of the computing device 800. Examples of transitory or non-tangible computer readable transmission media that may also participate in the provision of software, application programs, instructions and/or data to the computing device 800 include radio or infra-red transmission channels as well as a network connection to another computer or networked device, and the Internet or Intranets including e-mail transmissions and information recorded on Websites and the like.

The computer programs (also called computer program code) are stored in main memory 808 and/or secondary memory 810. Computer programs can also be received via the communication interface 824. Such computer programs, when executed, enable the computing device 800 to perform one or more features of embodiments discussed herein. In various embodiments, the computer programs, when executed, enable the processor 804 to perform features of the above-described embodiments. Accordingly, such computer programs represent controllers of the computer system 800.

Software may be stored in a computer program product and loaded into the computing device 800 using the removable storage drive 814, the hard disk drive 812, or the interface 820. Alternatively, the computer program product may be downloaded to the computer system 800 over the communications path 826. The software, when executed by the processor 804, causes the computing device 800 to perform functions of embodiments described herein.

In an implementation, there is provided a non-transitory computer readable medium having stored thereon executable instructions for controlling a system for facilitating user identification of a product to perform steps comprising: storing product data in association with a transmittable product identity; and providing the product data based on a comparison between the stored transmittable product identity and a received transmittable product identity. The received transmittable product identity is converted from a signal that is received by a receiver unit. The provided product data facilitates user identification of the product.

It is to be understood that the embodiment of FIG. 8 is presented merely by way of example. Therefore, in some embodiments one or more features of the computing device 800 may be omitted. Also, in some embodiments, one or more features of the computing device 800 may be combined together. Additionally, in some embodiments, one or more features of the computing device 800 may be split into one or more component parts.

In an implementation, a server may be generally described as a physical device comprising at least one processor and at least one memory including computer program code. The at least one memory and the computer program code are configured to, with the at least one processor, cause the physical device to perform the requisite operations.

In an implementation, there is provided a system for facilitating user identification of a product, the system comprising: at least one processor; and at least one memory including computer program code; the at least one memory and the computer program code configured to, with at least one processor, cause the system at least to: store product data in association with a transmittable product identity in the at least one memory; and provide the product data based on a comparison between the stored transmittable product identity and a received transmittable product identity. The received transmittable product identity is converted from a signal that is received by a receiver unit. The receiver unit is in direct communication or indirect communication with a transmitter unit that is coupled to the product and configured to transmit/broadcast the signal. The provided product data facilitates user identification of the product.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system for facilitating user identification of a product, comprising:
 a plurality of transmitter units, each transmitter unit coupled to a different product;
 a relay unit configured to invoke each of the plurality of transmitter units to transmit a signal to the relay unit, and to relay a collection signal corresponding to each signal transmitted by the plurality of transmitter units, wherein the collection signal is created by the relay unit based on a plurality of signals from at least two of the plurality of transmitter units;
 a receiver unit configured to receive the collection signal from the relay unit, wherein the signal that is transmitted by each of the plurality of transmitter units to the relay unit is in a different technological format from the collection signal that is relayed by the relay unit to the receiver unit;
 a memory module in communication with the receiver unit, the memory module having stored thereon a collection of product data that is stored in association with a stored transmittable collection identity, wherein the receiver unit is further configured to (i) convert the received collection signal into a converted transmittable collection identity and (ii) retrieve the collection of product data from the memory module based on a comparison between the stored transmittable collection identity and the converted transmittable collection identity; and
 an output unit configured to output the retrieved collection of product data to a user for facilitating user identification of each product coupled to one of the plurality of transmitter units, wherein the output unit is separate and distinct from the relay unit.

2. The system as claimed in claim 1, further comprising a computing device, wherein the computing device comprises the memory module and the computing device is in communication with the receiver unit.

3. The system as claimed in claim 1, wherein the receiver unit is further configured to decode and/or demodulate the received signal for converting the received signal into its corresponding transmittable product identity.

4. The system as claimed in claim 1, wherein the collection of product data comprises one or more of: a description of the product, a price of the product, and a merchant who is offering the product for each product coupled to one of the plurality of transmitter units.

5. The system as claimed in claim 1, wherein each signal is at least one of a sound wave or an electromagnetic wave.

6. A method for facilitating user identification of a product, comprising:
   receiving, by a relay unit, a signal transmitted by each of a plurality of transmitter units coupled to a different product, where each respective transmitted signal is invoked by the relay unit;
   relaying, by the relay unit, a collection signal corresponding to the signal received from each of the plurality of transmitter units, wherein the collection signal is created by the relay unit based on a plurality of signals from at least two of the plurality of transmitter units;
   receiving, by a receiver unit, the collection signal relayed from the relay unit, wherein the signal that is transmitted by each of the plurality of transmitter units to the relay unit is in a different technological format from the collection signal that is relayed by the relay unit to the receiver unit;
   storing, in a memory module, a collection of product data in association with a transmittable collection identity;
   converted, by the receiver unit, the collection signal into a converted transmittable collection identity; and
   providing, by an output unit, the collection of product data based on a comparison between the stored transmittable collection identity and the converted transmittable collection identity, wherein the provided collection of product data facilitates user identification of each product coupled to one of the plurality of transmitter units, wherein the output unit is separate and distinct from the relay unit.

7. The method as claimed in claim 6, wherein the collection of product data comprises one or more of: a description of the product, a price of the product, and a merchant who is offering the product for each product coupled to one of the plurality of transmitter units.

8. The method as claimed in claim 6, wherein each signal is at least one of a sound wave or an electromagnetic wave.

9. The method as claimed in claim 6, wherein the collection of product data is provided to an output unit that is configured to output the product data to a user for facilitating user identification of the product.

10. The method as claimed in claim 6, further comprising the steps of:
    storing an identity of an owner of the products in association with the transmittable collection identity; and,
    upon receipt of the transmittable collection identity, retrieving the identity of the owner of the products based on the received transmittable collection identity.

11. The method as claimed in claim 6, wherein converting the received transmittable collection identity from the received collection signal comprises decoding and/or demodulating the received collection signal into its corresponding transmittable collection identity.

12. A non-transitory computer readable medium having stored thereon executable instructions for controlling a system for facilitating user identification of a product to perform steps comprising:
    receiving, by a relay unit, a signal transmitted by each of a plurality of transmitter units coupled to a different product, where each respective transmitted signal is invoked by the relay unit;
    relaying, by the relay unit, a collection signal corresponding to the signal received from each of the plurality of transmitter units, wherein the collection signal is created by the relay unit based on a plurality of signals from at least two of the plurality of transmitter units;
    receiving, by a receiver unit, the collection signal relayed from the relay unit, wherein the signal that is transmitted by each of the plurality of transmitter units to the relay unit is in a different technological format from the collection signal that is relayed by the relay unit to the receiver unit;
    storing, in a memory module, a collection of product data in association with a transmittable collection identity;
    converted, by the receiver unit, the collection signal into a converted transmittable collection identity; and
    providing, by an output unit, the collection of product data based on a comparison between the stored transmittable collection identity and the converted transmittable collection identity, wherein the provided collection of product data facilitates user identification of each product coupled to one of the plurality of transmitter units, wherein the output unit is separate and distinct from the relay unit.

* * * * *